US012510528B2

(12) United States Patent
Srinivasan et al.

(10) Patent No.: US 12,510,528 B2
(45) Date of Patent: Dec. 30, 2025

(54) METHOD OF DETERMINING HYDROCARBON TYPE IN SOURCE ROCK SAMPLES

(71) Applicant: ARAMCO SERVICES COMPANY, Houston, TX (US)

(72) Inventors: Poorna Srinivasan, Houston, TX (US); David Jacobi, Spring, TX (US); Ibrahim Atwah, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 738 days.

(21) Appl. No.: 17/809,506

(22) Filed: Jun. 28, 2022

(65) Prior Publication Data

US 2023/0417728 A1 Dec. 28, 2023

(51) Int. Cl.
G01N 33/24 (2006.01)
G01N 30/02 (2006.01)
G01N 30/72 (2006.01)
G01N 30/88 (2006.01)
G01N 33/28 (2006.01)

(52) U.S. Cl.
CPC ....... *G01N 33/241* (2013.01); *G01N 30/7206* (2013.01); *G01N 2030/025* (2013.01); *G01N 2030/8854* (2013.01); *G01N 33/2823* (2013.01)

(58) Field of Classification Search
CPC ............. G01N 33/241; G01N 30/7206; G01N 2030/025; G01N 33/2823; G01N 2030/8854

USPC ....................................... 73/152.12
See application file for complete search history.

(56) References Cited

U.S. PATENT DOCUMENTS

2017/0226851 A1* 8/2017 Hakami ............. G01N 33/2823
2021/0080413 A1* 3/2021 Eichmann ............ G01N 33/241
2024/0241090 A1* 7/2024 Zhu ..................... G01N 33/2835

OTHER PUBLICATIONS

A.B. Ogbesejana, O. M. Bello, O. O. Akintade, O. J. Okunola, P. M. Osamudiamen, K. S. Kabo, T. Ali, U.A. Uduma, "DBT, PhDBTs, and BNTs in crude oils and source rock extracts from the Niger Delta Basin, Nigeria, and their applications"; Arabian Journal of Geosciences; vol. 14, Published Mar. 23, 2021 (Year: 2021).*

(Continued)

*Primary Examiner* — Peter J Macchiarolo
*Assistant Examiner* — John M Royston
(74) *Attorney, Agent, or Firm* — Osha Bergman Watanabe & Burton LLP (57) ABSTRACT

Methods and systems for determining a hydrocarbon type for a source sample are disclosed. The method includes obtaining a thermal maturity relationship and the source sample from a geological region of interest. The method further includes separating aromatic fraction from the source sample, and separating, measuring, and identifying responses of the aromatic fraction using gas chromatography-mass spectrometry (GC-MS) and determining a thermal maturity ratio using the responses. The method still further includes determining a thermal maturity indicator using the thermal maturity ratio and the thermal maturity relationship and determining the hydrocarbon type based on the thermal maturity indicator. The system includes a ball mill, a pipette column, a GC-MS system, and a computer processor.

18 Claims, 7 Drawing Sheets

(56) References Cited

OTHER PUBLICATIONS

B. J. Fuhr, C. Hawrelechko, L. R. Holloway, and H. Huang, "Comparison of Bitumen Fractionation Methods", Energy and Fuels 2005, vol. 19, pp. 1327-1329, Published May 5, 2005 (Year: 2005).*

Meijun Li et al.; "The distribution and origin of dimethyldibenzothiophenes in sediment extracts from the Liaohe Basin, East China", Organic Geochemistry; vol. 65; Oct. 17, 2013; pp. 63-73 (11 pages).

Karwan Abdulrahman Mustafa; "Unconventional Petroleum In Fine Grained Rocks", A thesis submitted for the degree of Doctober of Philosophy and the Diploma of Imperial College; Imperial College London; Oct. 2016; (274 pages).

G.O. Ogungbesan et al.; "Geochemical Record for the Depositional Condition and Petroleum Potential of the Late Cretaceous Mamu Formation in the Western Flank of Anambra Basin, Nigeria", Green Energy & Enviroment; Jan. 2020 (23 pages).

A. B. Ogbesejana et al.; "The distribution and significance of dimethyldibenzothiophenes, trimethyldibenzothiophenes and benzo[b]naphthothiophenes in source rock extracts from offshore Niger Delta basin, Nigeria", Petroleum Science and Technology; vol. 37; Issue 18; May 16, 2019 (9 pages).

D. K. Baskin and K. E. Peters; "Early Generation Characteristics of a Sulfur-Rich Monterey Kerogen", The American Association of Petroleum Geologists Bulletin; vol. 76; No. 1; Jan. 1992; pp. 1-13 (13 pages).

F. Cassani et al.; "Methylphenanthrene maturity index of marine source rock extracts and crude oils from the Maracaibo Basin", Organic Geochemistry; vol. 13; Issues 1-3; 1988; pp. 73-80 (8 pages).

A. Chakhmakhchev et al.; "Distribution of alkylated dibenzothiophenes in petroleum as a tool for maturity assessments", Organic Geochemistry; vol. 26; Issues 7-8; Apr. 1997; pp. 483-490 (7 pages).

I Goncharov et al.; "MDBT estimation ratio for transformation organic matter ratio in Bazhenov Formation of Western Siberia (Tomsk Oblast, Russia)", IOP Conference Series: Earth and Enviromental Science; vol. 24; 2015 (12 pages).

M. Li et al.; "The distribution and origin of dimethyldibenzothiophenes in sediment extracts from the Liaohe Basin, East China", Organic Geochemistry; vol. 65; Oct. 17, 2013; pp. 63-73 (11 pages).

L. Meijun et al.; "Oil maturity assessment using maturity indicators based on methylated dibenzothiophenes", Petroleum Science; vol. 11; 2014; pp. 234-246 (13 pages).

M. Li et al.; "The origin of trimethyldibenzothiophenes and their application as maturity indicators in sediments from the Liaohe Basin, East China", Fuel; vol. 103; 2013; pp. 299-307 (9 pages).

K. E. Peters and M. R. Cassa; "Applied Source Rock Geochemistry", The petroleum system—from source to trap: APPG Memoir 60; Ch. 5; 1994; pp. 93-120 (28 pages).

Matthias Radke; "Application of aromatic compounds as maturity indicators in source rocks and crude oils", Marine and Petroleum Geology; vol. 5; Aug. 1988; pp. 224-236 (13 pages).

K. E. Peters et al.; "Organic Geochemistry", The Biomarker Guide, Second Edition; Cambridge University Press; Chapter 2; 2005; pp. 18-44 (27 pages).

K. E. Peters et al.; "Geochemical screening", The Biomarker Guide, Second Edition; Cambridge University Press; Chapter 4; 2005; pp. 72-118 (46 pages).

K. E. Peters et al.; "Biomarker separation and analysis", The Biomarker Guide, Second Edition; Cambridge University Press; Chapter 8; 2005; pp. 198-251 (54 pages).

* cited by examiner

METHOD OF DETERMINING HYDROCARBON TYPE IN SOURCE ROCK SAMPLES

BACKGROUND

A source rock is defined as a rock rich in organic matter where the organic matter may generate hydrocarbons when sufficiently heated. Thermal maturity is defined as the degree to which a source rock is heated to generate such hydrocarbons. Characterizing the thermal maturity of source rocks provides insight into what hydrocarbon type a source rock may yield if the source rock hydrocarbons are produced to the surface. Hydrocarbon types may include immature, oil, wet gas, and dry gas. Thermal maturity indicators that may indicate hydrocarbon type include vitrinite reflectance, the temperature of maximum generative potential, and the hydrogen index.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to methods for determining a hydrocarbon type for a source sample. The method includes obtaining a thermal maturity relationship and the source sample from a geological region of interest. The method further includes separating aromatic fraction from the source sample, and separating, measuring, and identifying responses of the aromatic fraction using gas chromatography-mass spectrometry (GC-MS). The method still further includes determining a thermal maturity ratio for the source sample using the responses, determining a thermal maturity indicator using the thermal maturity ratio and the thermal maturity relationship, and determining the hydrocarbon type based on the thermal maturity indicator.

In general, in one aspect, embodiments relate to a non-transitory computer readable medium storing instructions executable by a computer processor. The instructions include functionality for receiving a thermal maturity indicator for a first portion of a source rock sample and responses of aromatic fraction for a second portion of the source rock sample. The instructions further include determining a thermal maturity ratio for the second portion using the responses. The instructions still further include determining a thermal maturity relationship based on the thermal maturity indicator and the thermal maturity ratio for a plurality of source rock samples.

In general, in one aspect, embodiments relate to a system. The system includes a ball mill to mechanically separate a source rock sample and a pipette column to separate aromatic fraction from a source sample. The system further includes a GC-MS system to measure and identify responses of the aromatic fraction. The system still further includes a computer processor configured to receive a thermal maturity indicator for a first portion of a source rock sample and the responses of the aromatic fraction for a second portion of the source rock sample. The computer processor is further configured to determine a thermal maturity ratio for the second portion using the responses. The computer processor is still further configured to determine a thermal maturity relationship based on the thermal maturity indicator and the thermal maturity ratio for a plurality of source rock samples.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a marine source fluid sample" includes reference to one or more of such samples.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-7, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

Source rocks may be defined as rock rich in organic matter where the organic matter may generate hydrocarbons in the form of oil and gas when sufficiently heated. The organic matter may constitute between 1% and 10% of a source rock. Source rocks may originate from lacustrine regions, terrestrial regions, marine regions, or a mixture. The most abundant organic matter constituent of a source rock is kerogen. Kerogen forms from the degradation of living matter such as algae, plankton, and terrestrial plants during sediment diagenesis. Three types of kerogen may have the potential to generate hydrocarbons. Each type of kerogen may be characterized by thermal maturity, which is defined as the degree to which a source rock has been heated to generate hydrocarbons from kerogen.

Figure 1:
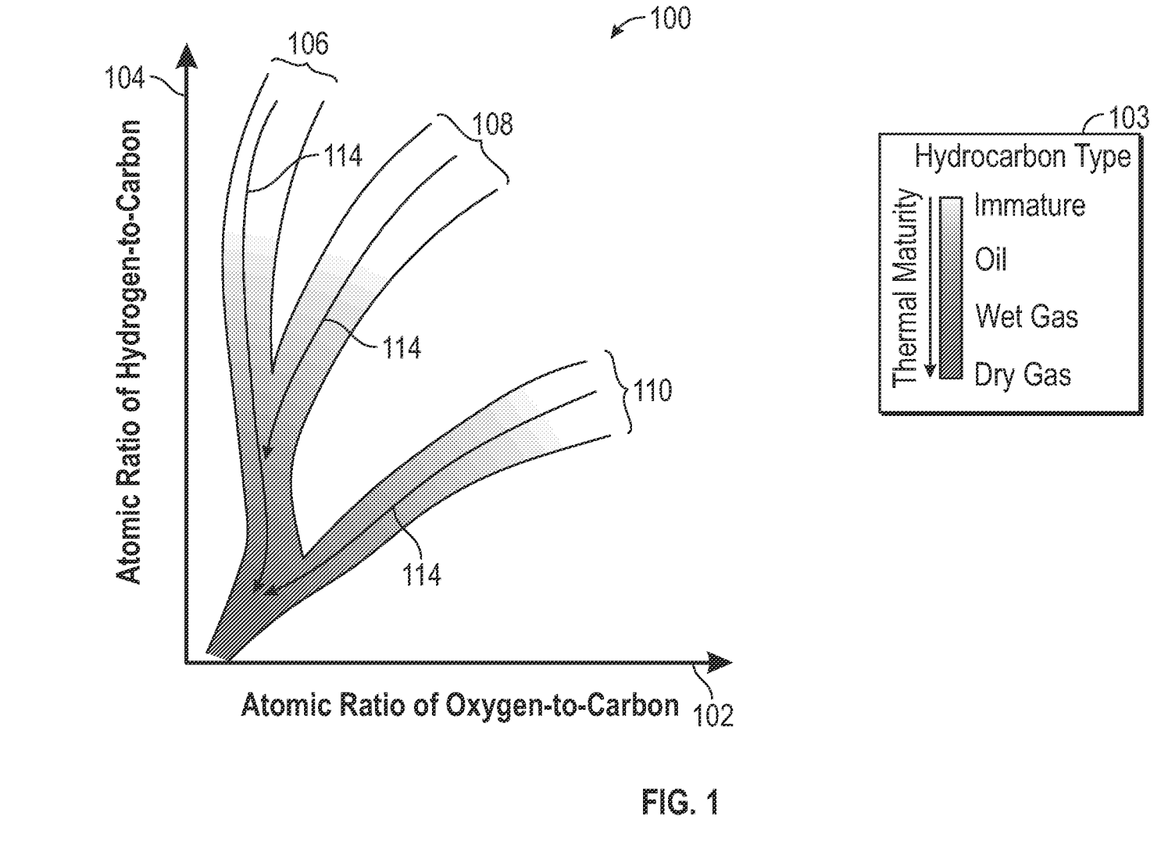
FIG. 1 displays a Van Krevelen diagram in accordance with one or more embodiments.

Kerogen within a source rock may be assessed for kerogen type, thermal maturity, and hydrocarbon type using a Van Krevelen diagram (100) as depicted in FIG. 1, in accordance with one or more embodiments. The Van Krevelen diagram (100) displays the atomic ratio of oxygen-to-carbon along the abscissa (102) and the atomic ratio of hydrogen-to-carbon along the ordinate (104). Types I, II, and III kerogen present distinctly on a Van Krevelen diagram (100). Type I kerogen (106) is characterized by low oxygen-to-carbon atomic ratios and high hydrogen-to-carbon atomic ratios. Type I kerogen (106) may primarily originate from algae within lacustrine regions. Type II kerogen (108) is characterized by intermediate oxygen-to-carbon atomic ratios and intermediate hydrogen-to-carbon atomic ratios. Type II kerogen (108) may primarily originate from plankton within marine regions. Type III kerogen (110) is characterized by high oxygen-to-carbon atomic ratios and low hydrogen-to-carbon atomic ratios. Type III kerogen (110) may primarily originate from plants within terrestrial regions.

As temperature, depth of burial, and/or duration of burial increase, each type of kerogen may increase in thermal maturity. Increasing temperature, and depth and/or duration of burial are all denoted by the three-pronged arrow (114). Thermal maturity may be separated into four distinct stages where each stage may yield a specific hydrocarbon type as shown by the key (102). The least mature thermal maturity are immature source rocks. Immature source rocks may be defined as kerogen that is not generating hydrocarbons. A more mature thermal maturity may yield oil. An even more mature thermal maturity may yield wet gas. Wet gas may be defined as kerogen that is generating gas with minimal methane. Lastly, the most mature thermal maturity may yield dry gas. Dry gas may be defined as kerogen that is generating gas with increased methane.

Thermal maturity indicators may be determined from source rock samples (hereinafter also "samples") and used to determine the hydrocarbon type the source rock may produce. One thermal maturity indicator is vitrinite reflectance, denoted % $R_o$. Vitrinite is a maceral constituent of kerogen that originates from the connective tissue of vascular plants. Vitrinite reflectance % $R_o$ is an average measure of the percentage of incident light reflected from the surface of vitrinite within a sample. Vitrinite reflectance % $R_o$ may be measured using a photometer microscope. As a source rock sample increases in thermal maturity and hydrocarbon type changes, vitrinite reflectance % $R_o$ increases as shown by Table (1).

TABLE (1)

| Hydrocarbon Type | Vitrinite Reflectance Range (% $R_o$) |
| --- | --- |
| Immature | 0.25-0.60 |
| Oil | 0.60-1.35 |
| Wet Gas | 1.35-1.50 |
| Dry Gas | >0.50 |

A person of ordinary skill in the art will appreciate that vitrinite reflectance % $R_o$ has historically been a common thermal maturity indicator used in the oil and gas industry. However, there are limitations to using vitrinite reflectance % $R_o$ as a thermal maturity indicator. For example, non-vitrinite material within a sample may be misidentified as vitrinite or vice versa. Further, oxidation and contamination may produce inaccurate vitrinite reflectance percentages. Lastly, because vitrinite may originate from the connective tissue of vascular plants, source rock from lacustrine regions and marine regions may contain little to no vitrinite. Thus, vitrinite reflectance % $R_o$ may be unsuitable as a thermal maturity indicator in marine source rock and lacustrine source rock.

Due to the limitations of using vitrinite reflectance % $R_o$ as a thermal maturity indicator in marine source rocks and lacustrine source rocks, other thermal maturity indicators have been developed. Two other thermal maturity indicators include the temperature of maximum generative potential $T_{max}$ and the hydrogen index HI.

The temperature of maximum generative potential $T_{max}$ is the temperature at which the maximum rate of hydrocarbon generation occurs in a sample. The hydrogen index HI is the number of hydrogen atoms per unit volume (i.e., hydrogen density) of a sample relative to the hydrogen density of pure water at surface conditions. As a source rock sample increases in thermal maturity and hydrocarbon type changes, the temperature of maximum generative potential $T_{max}$ increases and the hydrogen index HI decreases as shown by Table (2).

TABLE (2)

| Hydrocarbon Type | $T_{max}$ | HI |
| --- | --- | --- |
| Immature | <431 | >450 |
| Oil | 431-473 | 100-450 |
| Wet Gas | 473-480 | 50-100 |
| Dry Gas | >480 | 0-100 |

Both the temperature of maximum generative potential $T_{max}$ and the hydrogen index HI may be determined from pyrolysis.

Figure 2:
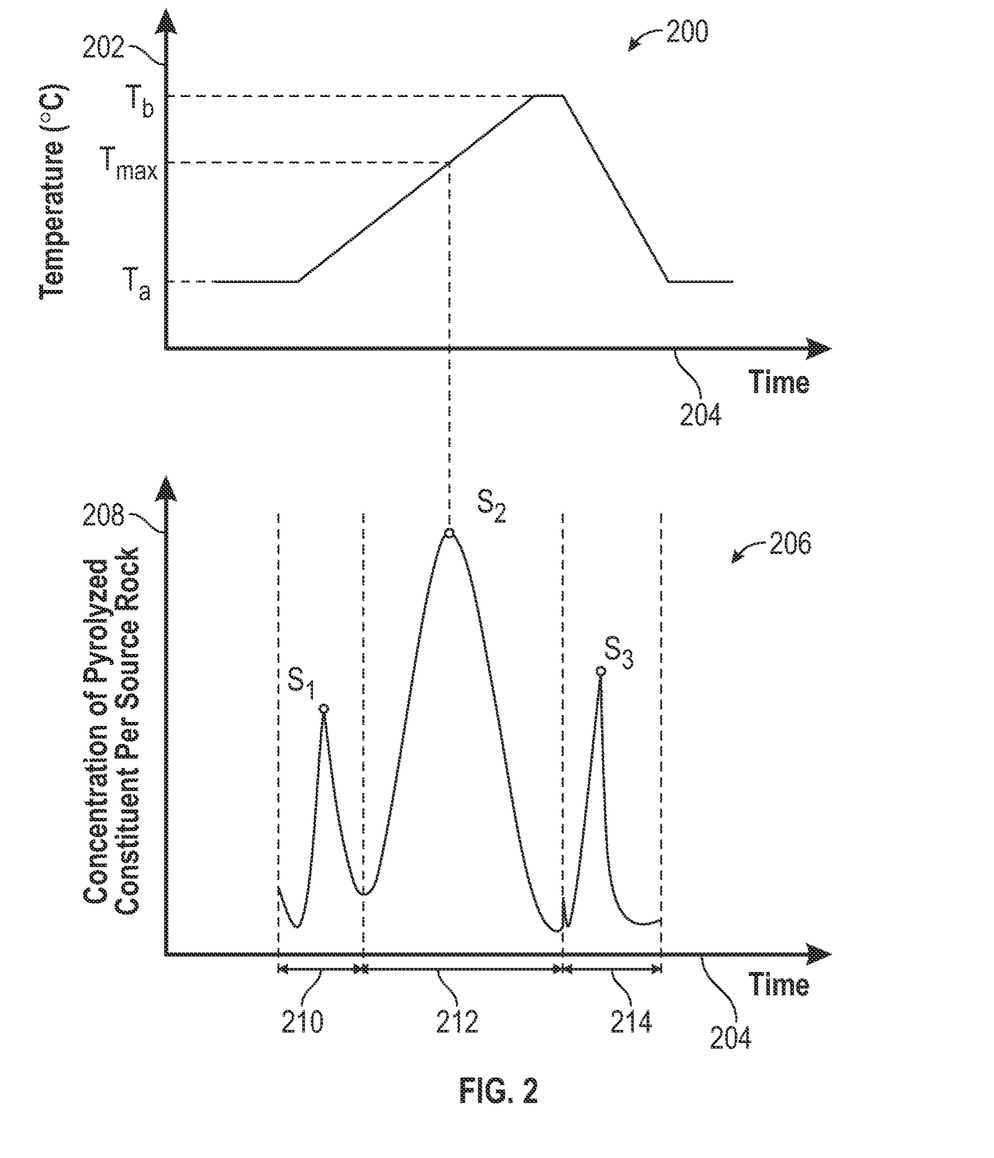
FIG. 2 depicts pyrolysis in accordance with one or more embodiments.

Pyrolysis is the process of thermally decomposing a sample in an inert atmosphere to analyze constituents of the sample. Pyrolysis may simulate thermal maturity and, thus, the generation of hydrocarbons if the sample has sufficient total organic carbon (TOC) content. Specifically, Rock-Eval pyrolysis may be used to analyze a source rock sample. FIG. 2 depicts temperature profiles of pyrolysis in accordance with one or more embodiments. Pyrolysis may be performed under hydrous or anhydrous conditions. Further, an entrained flow reactor may be used to perform a pyrolysis analysis. Profile 200 displays the entrained flow reactor temperature (202) over time (204) as a rise, hold, and decline profile where $T_a$ may be approximately 100° C. and $T_b$ may be approximately 650° C. Profile 200 may pyrolyze constituents within a sample over discrete time-windows. For example, profile 206 displays the pyrolyzation of three constituents from a source rock sample. Profile 206 displays the concentration of pyrolyzed constituent per amount of source rock (208), typically in units of milligrams per gram, per unit time (204). During pyrolysis, free hydrocarbons or hydrocarbons already present within the source rock sample, the first constituent, may be volatilized during the first time-window (210). Hydrocarbons formed from kerogen during pyrolysis thus far, the second constituent, may pyrolyze during the second time-window (212). Trapped carbon dioxide, the third constituent, may release during the third time-window (214). The three peaks, one in each time-window, are referred to as $S_1$, $S_2$, and $S_3$. The temperature at $S_2$ is the temperature of maximum generative potential $T_{max}$. The hydrogen index HI may be indirectly determined from pyrolysis such that:

$$HI = \frac{S_2}{TOC} \times 100 = \frac{S_2}{(0.082(S_1 + S_2) + S_4)/10} \times 100, \quad \text{Equation (1)}$$

where TOC is total organic carbon by percent and $S_4$ is the residual carbon concentration within the sample following pyrolysis.

As kerogen is heated, bitumen may form. Organic compounds within bitumen may be used to determine thermal maturity indicators. An organic compound is defined as any chemical compound with carbon-hydrogen bonds. The composition of bitumen may include classes of organic compounds such as aromatics (hereinafter also the "aromatic fraction") and asphaltenes. Some aromatics within bitumen may be sulfur-bearing aromatics such as polycyclic aromatic sulfur heterocyclic (PASH) compounds, where one series of PASH compounds is the alkylated dibenzothiophene (DBT) series. The alkylated DBT series consists of two benzene rings fused to a central thiophene ring, where thiophene is the heterocyclic compound that includes sulfur. Note that benzene is an aromatic hydrocarbon. The organic compounds of methyldibenzothiophene (MDBT), dimethyldibenzothiophene (DMDBT), trimethyldibenzothiophene (TMDBT), etc. along with the isomers of each compound reside in the alkylated DBT series. Hereinafter any compound within the alkylated DBT series may be referred to as an "aromatic compound" or simply a "compound" and any isomer within the alkylated DBT series may be referred to as simply an "isomer."

The aromatic fraction, which contains MDBT, DMDBT, and TMDBT, may be separated from a source rock sample. In some embodiments, bitumen may be initially separated from source rock samples using a solvent, such as dichloromethane. The bitumen and solvent may then be exchanged with a reactant, such as hexane, to reduce the solvent. Exchange may be performed using a rotary evaporator. The bitumen (and minimal remaining solvent) may undergo chromatographic separation to elute the aromatic fraction from the bitumen. For example, activated silica powder may be introduced into a pipette column, then hexane introduced, then dichloromethane introduced to ultimately elute the aromatic fraction.

Gas chromatography—mass spectrometry (GC-MS) may be used to separate, measure, and identify isomers from the aromatic fraction (hereinafter also "analyte") previously separated from bitumen. The analyte is separated by isomer based on the boiling point and affinity for the chromatography column of each isomer.

The aromatic fraction may be volatilized and passed through the chromatography column using a carrier gas. The carrier gas may be helium. The chromatography column resides in an oven to control the temperature of the carrier gas. Further, the chromatography column may be made up of a stationary phase, such as phenyl-methylpolysiloxane. The isomers being separated will have different affinities for the stationary phase. For example, as a carrier gas carries the analyte through the chromatography column, different isomers will interact with the stationary phase for different lengths of time due to the different affinities. As such, different isomers will travel at different velocities and thereby separate. The time is takes for each isomer to pass through the chromatography column and separate is denoted "retention time."

Figure 3A:
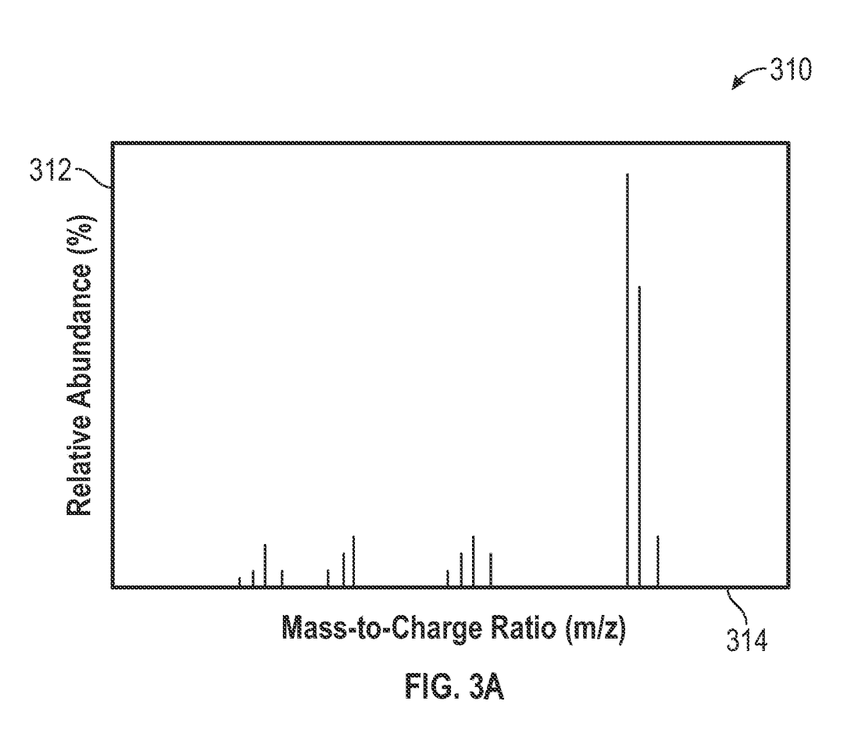
FIG. 3A displays a mass spectrum in accordance with one or more embodiments.

Following separation, each isomer is immediately detected and measured using mass spectrometry (MS). MS may be performed using a mass spectrometer. During mass spectrometry, each isomer is ionized typically using electron ionization where each isomer is bombarded with a beam of free electrons emitted from a filament. Chemical ionization may alternatively be used. Isomer-electron collisions may cause an isomer to fragment into positively charged ions. The fragmented ions (hereinafter also "ions") are then accelerated and subjected to an electric or magnetic field to cause deflection. Ions with the same mass-to-charge ratio will deflect by the same amount. The deflected ions may then be detected by an electron multiplier from which a mass spectrum (310) may be displayed as shown in FIG. 3A. A mass spectrum (310) presents the relative abundance of ions detected by the electron multiplier relative to the mass-to-charge ratios of the ions. In FIG. 3A, the relative abundance is displayed along the ordinate (312) and the mass-to-charge ratio is displayed along the abscissa (314). The mass spectrum (310) may be referred to as a fragmentation pattern from which the compound of the analyte may be identified by comparing the fragmentation pattern to a mass spectrum library. The mass-to-charge ratio may be represented as m/z were m is the mass of the ion and z is the number of elementary charges on the ion.

Figure 3B:
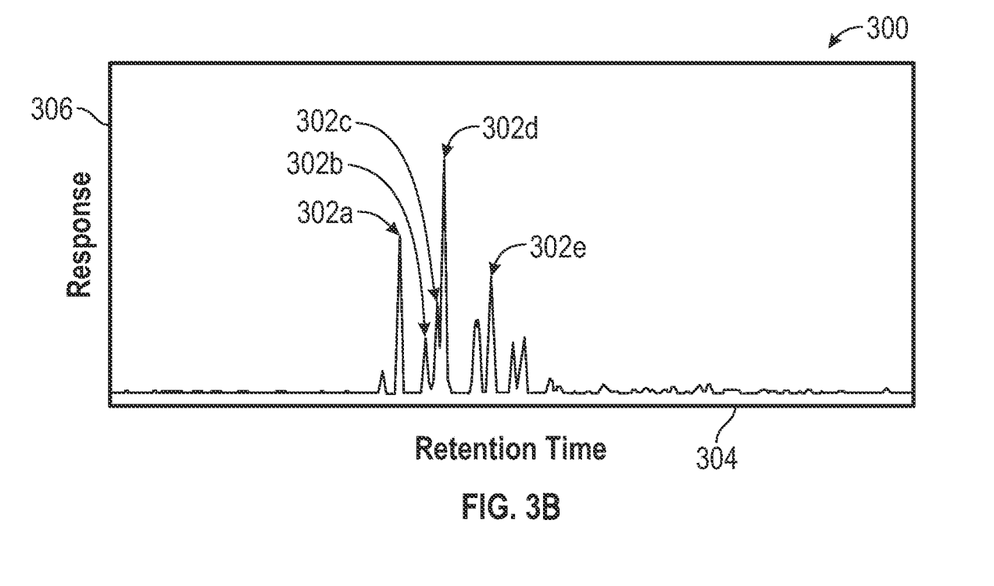
FIG. 3B displays a mass chromatogram in accordance with one or more embodiments.

Following GC-MS, a mass chromatogram (300) may display a series of responses (302a-e) as depicted in FIG. 3B. The abscissa (304) represents retention time, the ordinate (306) represents a magnitude of the response, and each response (302a-e) represents one or more isomers. Each response (302a-e) may be associated to an isomer of a compound based on when the isomer eluted during GC and what the mass-to-charge ratio determined during mass spectrometry (MS) is. Some responses may be associated to an isomer by comparing the retention time of the response on the mass chromatogram (300) to the retention time of the response on a mass chromatogram for an isomer standard. Further, some responses may be associated to an isomer using a mass spectrum library.

Each response (302a-e) on the mass chromatogram (300) in FIG. 3B may now be associated to an isomer of a compound. For example, the responses (302a-e) within the mass chromatogram (300) in FIG. 3B may be one compound, such as DMDBT. Each response (302a-e) may be one or more isomers of DMDBT. For example, response 302a may be associated to the isomer 4,6-dimethyldibenzothiophene (4,6-DMDBT) and response 302d may be associated to the isomer 3,6-dimethyldibenzothiophene (3,6-DMDBT). Note that each number series, such as "4,6" in 4,6-DMDBT, denotes the locations of the two methyl groups relative to each of the benzene rings. As such, isomers of TMDBT would contain a number series of three numbers, such as 2,4,6-trimethyldibenzothiophene (2,4,6-TMDBT).

Table (3) lists an example of the settings associated with separating, measuring, and identifying isomers of the alkylated DBT series using GC-MS, in accordance with one or more embodiments.

TABLE (3)

| | |
|---|---|
| GC-MS Instrument | Agilent 7890B GC/5977MS |
| Carrier Gas | Helium |
| Flow Rate | 1.2 mL/min |
| Chromatography Column | DB-5MS (5%-phenylmethylpolysiloxane) fused silica capillary column (60 m × 0.32 mm, 0.25 μm thickness) |
| Ramp Profile | oven held at 90° C. for 1 min, ramped at 3° C./min until 310° C., isothermal hold for 50 mins |
| Inlet Temperature | 310° C. |

A person of ordinary skill in the art will appreciate that other GC-MS instruments, carrier gases, flow rates, chromatography columns, ramp profiles, and inlet temperatures may be used without departing from the scope of the disclosure.

Figure 4:
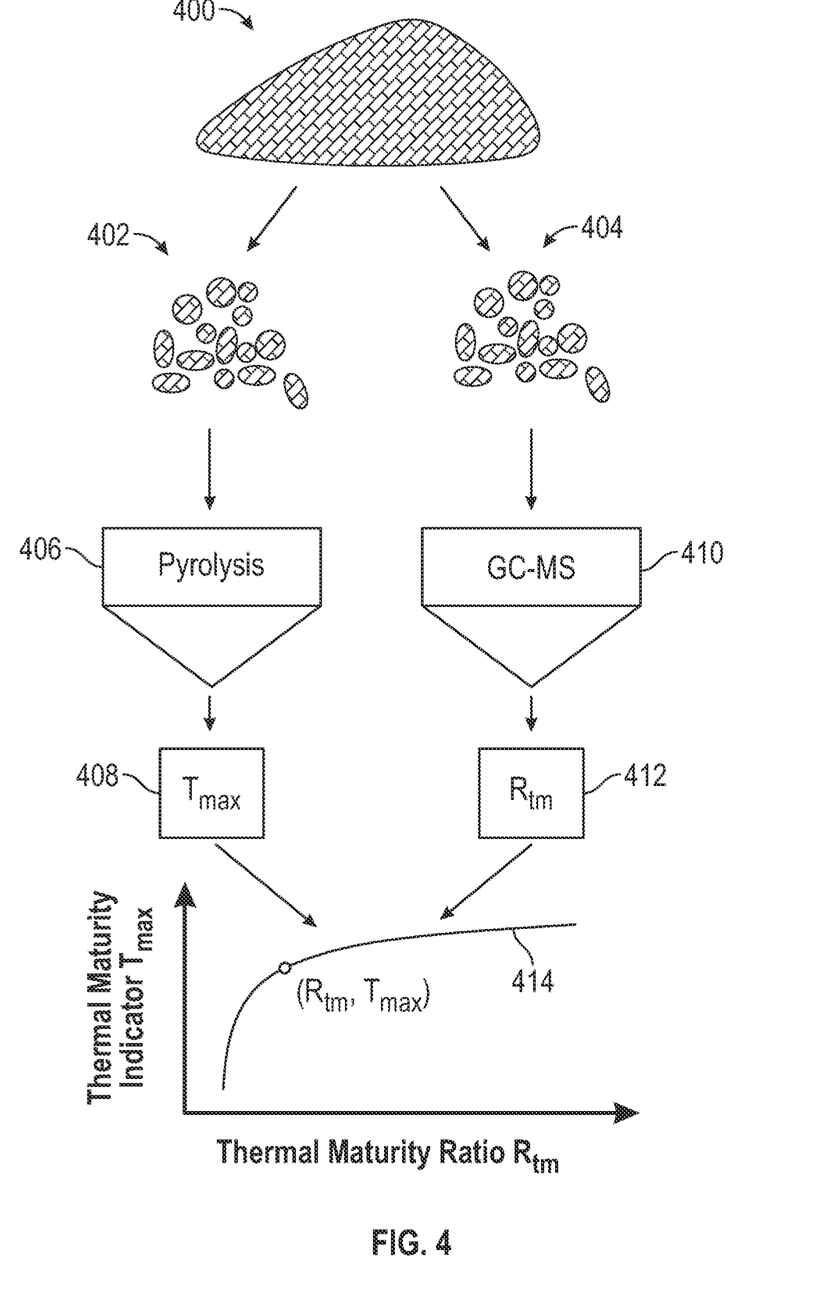
FIG. 4 shows a workflow in accordance with one or more embodiments.

FIG. 4 shows a workflow to determine a thermal maturity relationship (414) from source rock samples (400) in accordance with one or more embodiments. The source rock samples (400) may be from a variety of geological regions of interest. Each source rock sample (400) may be mechanically separated or divided into a first portion (402) and a second portion (404). In some embodiments, mechanical separation may include cutting using a diamond saw, fragmenting using a jaw crusher, and/or grinding using a ball mill Both the first portion (402) and second portion (404) are mechanically separated until the source rock samples (400) of each portion reach grain sizes between 250-500 μm.

The first portion (402) may be used to determine a thermal maturity indicator (408). In some embodiments, photometer microscopy may be used on the first portion (402) to determine the vitrinite reflectance % $R_o$ thermal maturity indicator (408), if vitrinite is present. In other embodiments, pyrolysis (406) may be performed on the first portion (402) to determine a thermal maturity indicator (408), such as the temperature of maximum generative potential $T_{max}$ and/or the hydrogen index HI. FIG. 4 shows pyrolysis (406) being used to determine the thermal maturity indicator (408) of the temperature of maximum generative potential $T_{max}$. Further, the amount of source rock samples (400) from the first portion (402) used for pyrolysis may range from approximately 60 milligrams to 100 milligrams.

The second portion (404) may be used to determine a thermal maturity ratio (412) using the responses measured and identified from GC-MS (410). The amount of source rock samples (400) from the second portion (404) may range from approximately 7 grams to 33 grams. The thermal maturity ratio $R_{tm}$ (412) is determined using the responses within a mass chromatogram (300) for specific isomers. In some embodiments, the thermal maturity ratio $R_{tm}$ (412) may be defined using the responses of specific isomers of a compound such that:

$$R_{tm} = \frac{4,6-DMDBT}{1,4-DMDBT + 1,6-DMDBT}. \quad \text{Equation (2)}$$

In other embodiments, the responses of specific isomers of another aromatic compound may define a thermal maturity ratio $R_{tm}$ (412) such that:

$$R_{tm} = \frac{2,4,6-TMDBT}{1,4,6-TMDBT + 1,4,8-TMDBT + 3,4,6-TMDBT}. \quad \text{Equation (3)}$$

What compound within the alkylated DBT series and which isomers of that compound are used to define the thermal maturity ratio $R_{tm}$ (412) should in no way limit this disclosure. Further, any combination of isomers may be used to define the numerator and denominator of the thermal maturity ratio $R_{tm}$ (412).

Determination of the thermal maturity indicator (408) and the thermal maturity ratio $R_{tm}$ (412) may be repeated for numerous rock source samples (400) to determine a thermal maturity ratio-thermal maturity indicator pair ($R_{tm}$, $T_{max}$) for each rock source sample (400). A curve may then be fit to all thermal maturity ratio-thermal maturity indicator pairs to determine a thermal maturity relationship (414). Curve fitting methods may include interpolation or regression. Further, curve fitting may include fitting a linear, polynomial, exponential, power, logarithmic, or periodic curve to the thermal maturity ratio-thermal maturity indicator pairs. A person of ordinary skill in the art will appreciate the numerous curve fitting methods and curves available to determine the thermal maturity relationship (414). The thermal maturity relationship (414) may be used to assess what hydrocarbon type a source sample may yield when the hydrocarbon type of the source rock from which the source sample came is unknown or misleading. Further, the thermal maturity relationship (414) may be used to assess what hydrocarbon type of the source rock from which the source sample came when the source rock is difficult or unable to be obtained.

Figure 5:
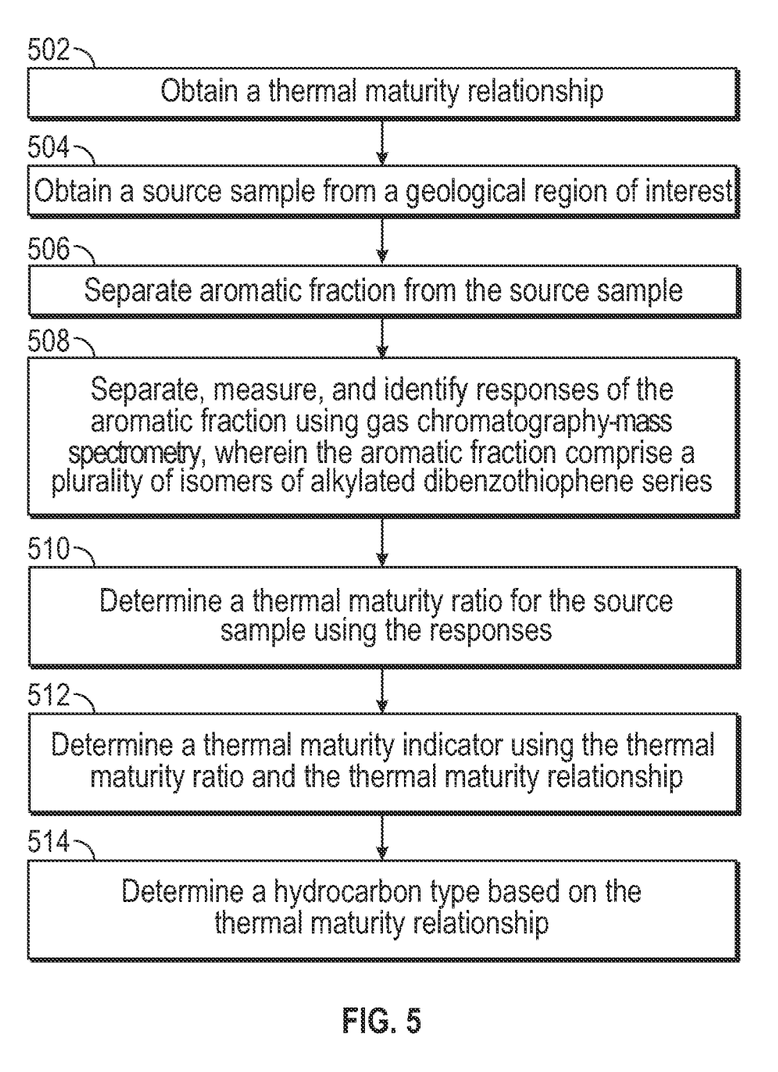
FIG. 5 shows a flowchart in accordance with one or more embodiments.

FIG. 5 shows a flowchart to determine the hydrocarbon type for a source sample in accordance with one or more embodiments. In step 502, a thermal maturity relationship (414) may be obtained as previously described relative to FIG. 4. The thermal maturity relationship (414) may be obtained by first mechanically separating or dividing each of numerous source rock samples (400) into a first portion (402) and a second portion (404). In some embodiments, a thermal maturity indicator (408) may be determined for the first portion (402) and a thermal maturity ratio (412) may be determined for the second portion (404). In other embodiments, the thermal maturity indicator (408) may be determined for the second portion (404) and a thermal maturity ratio (412) may be determined for the first portion (402). Isomers of the alkylated DBT series within the aromatic fraction may be separated, measured, and identified using GC-MS (410) and the responses of specific isomers may be used to determine the thermal maturity ratio (412). The thermal maturity relationship (414) may then be determined by fitting a curve to the thermal maturity indicator (408) for the first portion (402) and the thermal maturity ratio (412) for the second portion (404) for numerous source rock samples (400). The source rock samples (400) may contain bitumen.

In step 504, a source sample may be obtained from a geological region of interest. In some embodiments, the source sample may be a marine source fluid sample, a marine source rock sample, a lacustrine source fluid sample, or a lacustrine source rock sample. The source sample may be obtained from a well that produces hydrocarbons. Further, the source sample may contain bitumen.

In step 506, the aromatic fraction is separated from the source sample. Bitumen may be initially separated from the source sample. Then, the aromatic fraction may be eluted from the bitumen.

In step 508, isomers of the alkylated DBT series within the aromatic fraction are separated, measured, and identified using GC-MS (410). One or more isomers are measured using a response. Each response may be identified as at least one isomer of a compound within the alkylated DBT series. The responses may be plotted relative to retention time to display a mass chromatogram (300).

In step 510, a thermal maturity ratio (412) is determined for the source sample using the responses. Equations (2) and (3) provide two embodiments of the thermal maturity ratio (412).

In step 512, a thermal maturity indicator (408) is determined using the thermal maturity ratio (412) and the thermal maturity relationship (414).

In step 514, the hydrocarbon type that the source sample may yield is determined based on the thermal maturity indicator (408). In some embodiments, the thermal maturity indicator (408) is associated to the hydrocarbon type as shown in Tables (1) and (2). The hydrocarbon type may be immature, oil, wet gas, or dry gas.

Figure 6A:
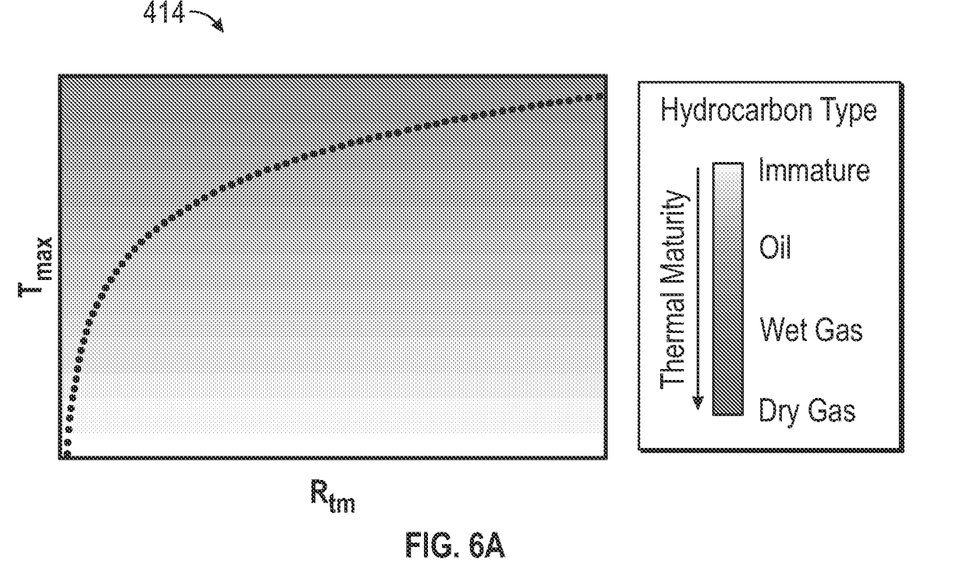
FIG. 6A displays a thermal maturity relationship in accordance with one or more embodiments.
Figure 6B:
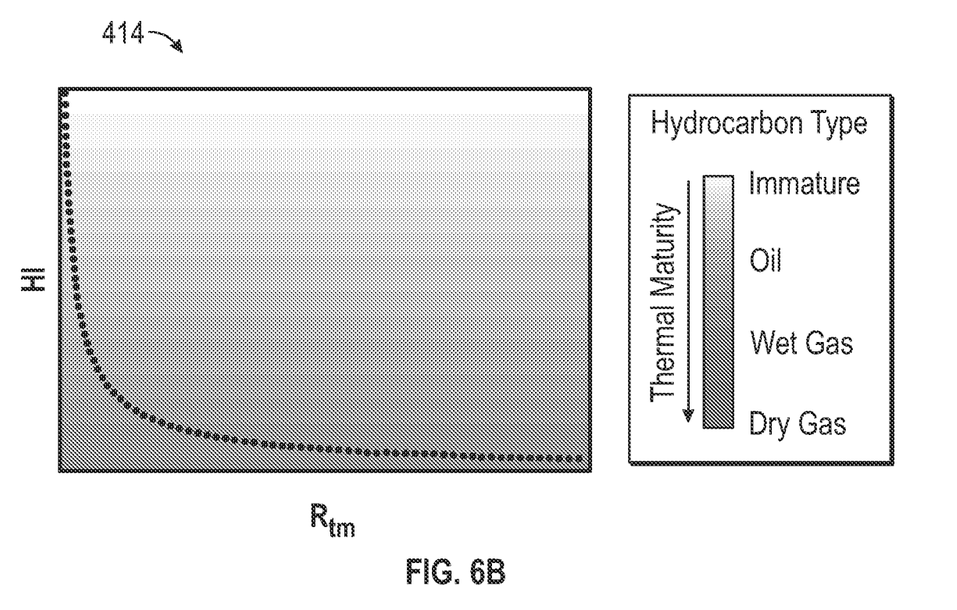
FIG. 6B displays a thermal maturity relationship in accordance with one or more embodiments.

FIGS. 6A and 6B each display a thermal maturity relationship (414) in accordance with one or more embodiments. FIG. 6A displays the thermal maturity relationship (414) between the thermal maturity indicator (408) the temperature of maximum generative potential $T_{max}$ and the thermal maturity ratio (412) given in Equation (2). FIG. 6B displays the thermal maturity relationship (414) between the thermal maturity indicator (408) the hydrogen index HI and the thermal maturity ratio (412) given in Equation (2). The thermal maturity ratio (412) may also be determined from a source fluid sample using the same thermal maturity relationship (414) as the source rock sample to identify a hydrocarbon type.

Knowing the hydrocarbon type for a source sample may provide insight, at least in part, into whether producing the hydrocarbons of the source to the surface is economical. For example, it may not be economical to produce immature hydrocarbons to the surface. Further, knowing the hydrocarbon type may be used, at least in part, to enhance models, such as basin models and petroleum systems models, used to describe the geological region of interest. Such models may be used to predict hydrocarbon migration and location, which made aid in current and future hydrocarbon exploration endeavors.

Figure 7:
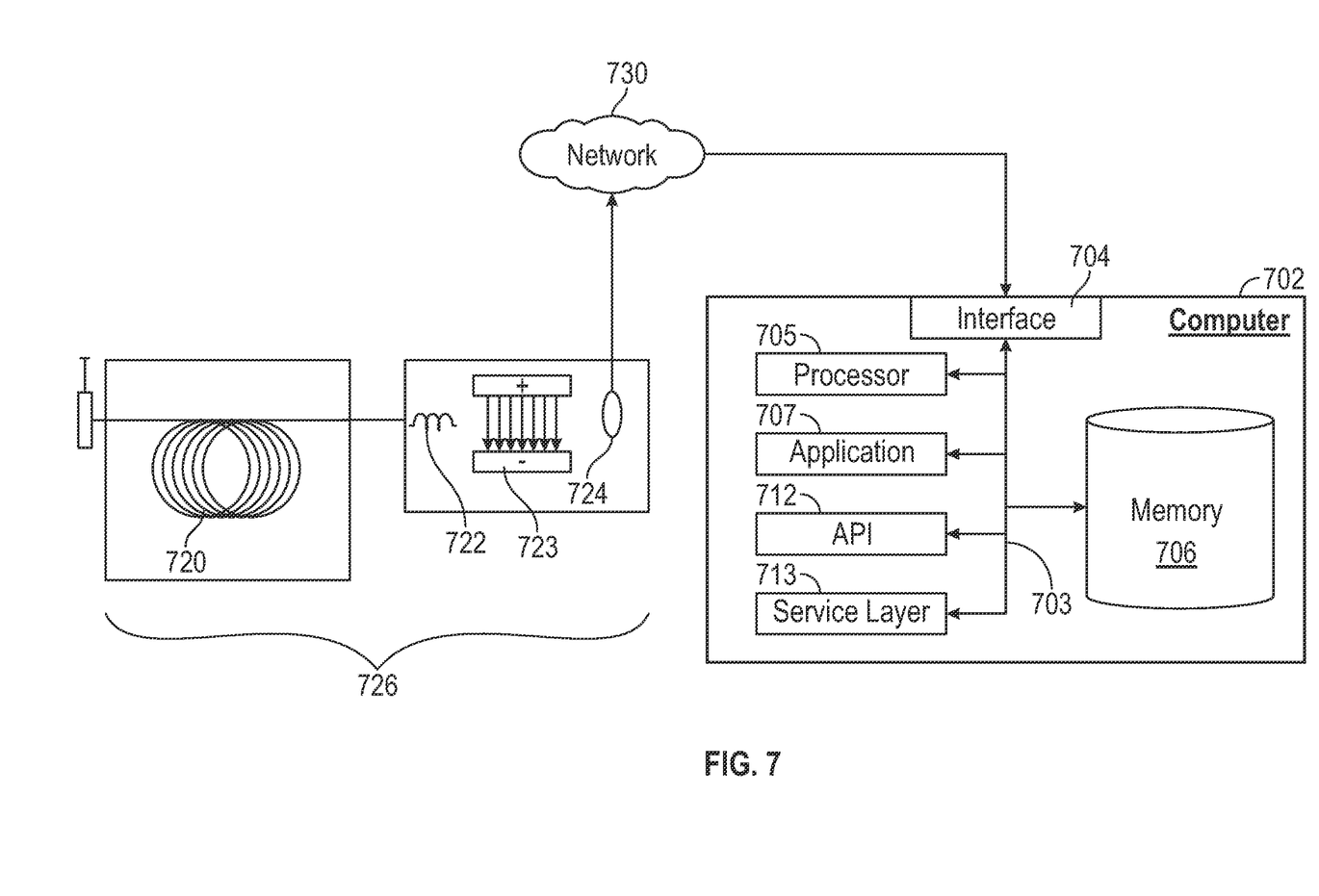
FIG. 7 depicts systems in accordance with one or more embodiments.

FIG. 7 depicts systems in accordance with one or more embodiments. In some embodiments, a source rock sample (400) or source fluid sample may be separated, measured, and identified into isomers of the alkylated DBT series within the aromatic fraction using a GC-MS system (726).

The GC portion of the GC-MS system (726) may include a chromatography column (720). The MS portion of the GC-MS system (726) may include a filament (722) that fragments the isomers into ions using a beam of free electrons. The ions are then subjected to an electric field (723) and detected by an electron multiplier (724). The mass spectrums (310) and mass chromatograms (300) output from the GC-MS system (726) may be transferred to a computer (702) via a network (730).

The computer (702) is used to provide computational functionalities associated with described algorithms, methods, functions, processes, flows, and procedures as described in this disclosure, according to one or more embodiments. The illustrated computer (702) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (702) may include a computer that includes an input device, such as a keypad, keyboard, touch screen, or other device that can accept user information, and an output device that conveys information associated with the operation of the computer (702), including digital data, visual, or audio information (or a combination of information), or a GUI.

The computer (702) can serve in a role as a client, network component, a server, a database or other persistency, or any other component (or a combination of roles) of a computer system for performing the subject matter described in the instant disclosure. The illustrated computer (702) is communicably coupled with a network (730). In some implementations, one or more components of the computer (702) may be configured to operate within environments, including cloud-computing-based, local, global, or other environment (or a combination of environments).

At a high level, the computer (702) is an electronic computing device operable to receive, transmit, process, store, or manage data and information associated with the described subject matter. According to some implementations, the computer (702) may also include or be communicably coupled with an application server, e-mail server, web server, caching server, streaming data server, business intelligence (BI) server, or other server (or a combination of servers).

The computer (702) can receive requests over network (730) from a client application (for example, from the gas chromatography-mass spectrometry system (726)) and responding to the received requests by processing the said requests in an appropriate software application. In addition, requests may also be sent to the computer (702) from internal users (for example, from a command console or by other appropriate access method), external or third-parties, other automated applications, as well as any other appropriate entities, individuals, systems, or computers.

Each of the components of the computer (702) can communicate using a system bus (703). In some implementations, any or all of the components of the computer (702), both hardware or software (or a combination of hardware and software), may interface with each other or the interface (704) (or a combination of both) over the system bus (703) using an application programming interface (API) (712) or a service layer (713) (or a combination of the API (712) and service layer (713). The API (712) may include specifications for routines, data structures, and object classes. The API (712) may be either computer-language independent or dependent and refer to a complete interface, a single function, or even a set of APIs. The service layer (713) provides software services to the computer (702) or other components (whether or not illustrated) that are communicably coupled to the computer (702). The functionality of the computer (702) may be accessible for all service consumers using this service layer. Software services, such as those provided by the service layer (713), provide reusable, defined business functionalities through a defined interface. For example, the interface may be software written in JAVA, C++, or other suitable language providing data in extensible markup language (XML) format or another suitable format. While illustrated as an integrated component of the computer (702), alternative implementations may illustrate the API (712) or the service layer (713) as stand-alone components in relation to other components of the computer (702) or other components (whether or not illustrated) that are communicably coupled to the computer (702). Moreover, any or all parts of the API (712) or the service layer (713) may be implemented as child or sub-modules of another software module, enterprise application, or hardware module without departing from the scope of this disclosure.

The computer (702) includes an interface (704). Although illustrated as a single interface (704) in FIG. 7, two or more interfaces (704) may be used according to particular needs, desires, or particular implementations of the computer (702). The interface (704) is used by the computer (702) for communicating with other systems in a distributed environment that are connected to the network (730). Generally, the interface (704) includes logic encoded in software or hardware (or a combination of software and hardware) and operable to communicate with the network (730). More specifically, the interface (704) may include software supporting one or more communication protocols associated with communications such that the network (730) or interface's hardware is operable to communicate physical signals within and outside of the illustrated computer (702).

The computer (702) includes at least one computer processor (705). Although illustrated as a single computer processor (705) in FIG. 7, two or more processors may be used according to particular needs, desires, or particular implementations of the computer (702). Generally, the computer processor (705) executes instructions and manipulates data to perform the operations of the computer (702) and any algorithms, methods, functions, processes, flows, and procedures as described in the instant disclosure.

The computer (702) also includes a memory (706) that holds data for the computer (702) or other components (or a combination of both) that can be connected to the network (730). For example, memory (706) can be a database storing data consistent with this disclosure. Although illustrated as a single memory (706) in FIG. 7, two or more memories may be used according to particular needs, desires, or particular implementations of the computer (702) and the described functionality. While memory (706) is illustrated as an integral component of the computer (702), in alternative implementations, memory (706) can be external to the computer (702).

The application (707) is an algorithmic software engine providing functionality according to particular needs, desires, or particular implementations of the computer (702), particularly with respect to functionality described in this disclosure. For example, application (707) can serve as one or more components, modules, applications, etc. Further, although illustrated as a single application (707), the application (707) may be implemented as multiple applications (707) on the computer (702). In addition, although illustrated as integral to the computer (702), in alternative implementations, the application (707) can be external to the computer (702).

There may be any number of computers (702) associated with, or external to, a computer system containing a computer (702), wherein each computer (702) communicates over network (730). Further, the term "client," "user," and other appropriate terminology may be used interchangeably as appropriate without departing from the scope of this disclosure. Moreover, this disclosure contemplates that many users may use one computer (702), or that one user may use multiple computers (702).

The described disclosure provides methods and systems of determining a hydrocarbon type for a source sample. A thermal maturity indicator (408) and a thermal maturity ratio (412) are determined for each of several source rock samples (400). The thermal maturity indicators (408) may be determined using a photometer microscope or pyrolysis (406), in some embodiments. The thermal maturity ratios (412) are determined using GC-MS (410). A curve is fit to the thermal maturity indicators (408) and thermal maturity ratios (412) to determine a thermal maturity relationship (414). A thermal maturity ratio (412) of the source sample may then be determined using GC-MS (410). A thermal maturity indicator (408) of the source sample may then be determined using the thermal maturity ratio (412) of the source sample and the thermal maturity relationship (414). The hydrocarbon type that the source sample may produce may then be determined using the thermal maturity indicator (408) of the source sample.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method of determining a hydrocarbon type for a source sample, the method comprising:
    obtaining, using a computer processor, a thermal maturity relationship comprising:
        obtaining a plurality of source rock samples,
        for each source rock sample among the plurality of source rock samples:
            mechanically separating each source rock sample into a first portion and a second portion;
            determining a first thermal maturity indicator for the first portion;
            separating a first aromatic fraction from the second portion;
            separating, measuring, and identifying first responses of the first aromatic fraction of the second portion using gas chromatography-mass spectrometry (GC-MS); and
            determining a first thermal maturity ratio for the second portion using the first responses, and
        determining the thermal maturity relationship based on the first thermal maturity indicator and the first thermal maturity ratio for the plurality of source rock samples;
    obtaining the source sample from a geological region of interest;
    separating an aromatic fraction from the source sample;
    separating, measuring, and identifying responses of the aromatic fraction using GC-MS, wherein the aromatic fraction comprises a plurality of isomers of alkylated dibenzothiophene (DBT) series;

determining a thermal maturity ratio using the responses;

determining a thermal maturity indicator using the thermal maturity ratio and the thermal maturity relationship; and determining the hydrocarbon type based on the thermal maturity indicator.

2. The method of claim 1, wherein the source sample comprises a marine source fluid sample.

3. The method of claim 1, wherein separating the aromatic fraction from the source sample comprises:

separating bitumen from the source sample using a solvent;

exchanging the bitumen and the solvent with a reactant; and eluting the aromatic fraction from the bitumen.

4. The method of claim 1, wherein the plurality of isomers of the alkylated DBT series comprises 4,6-dimethyldibenzothiophene.

5. The method of claim 1, wherein the thermal maturity ratio comprises the responses of:

$$\frac{4,6-\text{dimethyldibenzothiophene}}{1,4-\text{dimethyldibenzothiophene}+1,6-\text{dimethyldibenzothiophene}}.$$

6. The method of claim 1, wherein the thermal maturity indicator comprises a temperature of maximum generative potential.

7. The method of claim 1, wherein the hydrocarbon type comprises a wet gas.

8. The method of claim 1, wherein each of the plurality of source rock samples comprises bitumen.

9. The method of claim 1, wherein the first portion comprises between 60 milligrams to 100 milligrams of each source rock sample.

10. The method of claim 1, wherein the second portion comprises between 7 grams to 33 grams of each source rock sample.

11. The method of claim 1, wherein determining the first thermal maturity indicator for the first portion comprises using pyrolysis.

12. A system comprising:

for each source rock sample among a plurality of source rock samples:

a ball mill configured to mechanically separate each source rock sample into a first portion and a second portion, an entrained flow reactor configured to determine a first thermal maturity indicator for the first portion, a pipette column configured to separate a first aromatic fraction from the second portion, a gas chromatography-mass spectrometry (GC-MS) system configured to separate, measure, and identify first responses of the first aromatic fraction from the second portion, and a computer system configured to:

determine a first thermal maturity ratio for the second portion using the first responses; and determine a thermal maturity relationship based on the first thermal maturity indicator and the first thermal maturity ratio for the plurality of source rock samples;

wherein the pipette column is further configured to:

receive a source sample from a geological region of interest, and separate an aromatic fraction from the source sample;

wherein the GC-MS system is further configured to separate, measure, and identify responses of the aromatic fraction, wherein the aromatic fraction comprises a plurality of isomers of alkylated dibenzothiophene (DBT) series; and wherein the computer system is further configured to:

receive the thermal maturity relationship, determine a thermal maturity ratio using the responses, determine a thermal maturity indicator using the thermal maturity ratio and the thermal maturity relationship, and determine a hydrocarbon type for the source sample based on the thermal maturity indicator.

13. The system of claim 12, wherein the source sample comprises a marine source fluid sample.

14. The system of claim 12, wherein the pipette column is configured to separate the aromatic fraction from the source sample by:

separating bitumen from the source sample using a solvent;

exchanging the bitumen and the solvent with a reactant; and eluting the aromatic fraction from the bitumen.

15. The system of claim 12, wherein the plurality of isomers of the alkylated DBT series comprises 4,6-dimethyldibenzothiophene.

16. The system of claim 12, wherein the thermal maturity ratio comprises the responses of:

$$\frac{4,6-\text{dimethyldibenzothiophene}}{1,4-\text{dimethyldibenzothiophene}+1,6-\text{dimethyldibenzothiophene}}.$$

17. The system of claim 12, wherein the thermal maturity indicator comprises a temperature of maximum generative potential.

18. The system of claim 12, wherein the hydrocarbon type comprises a wet gas.

* * * * *